Figure 1:
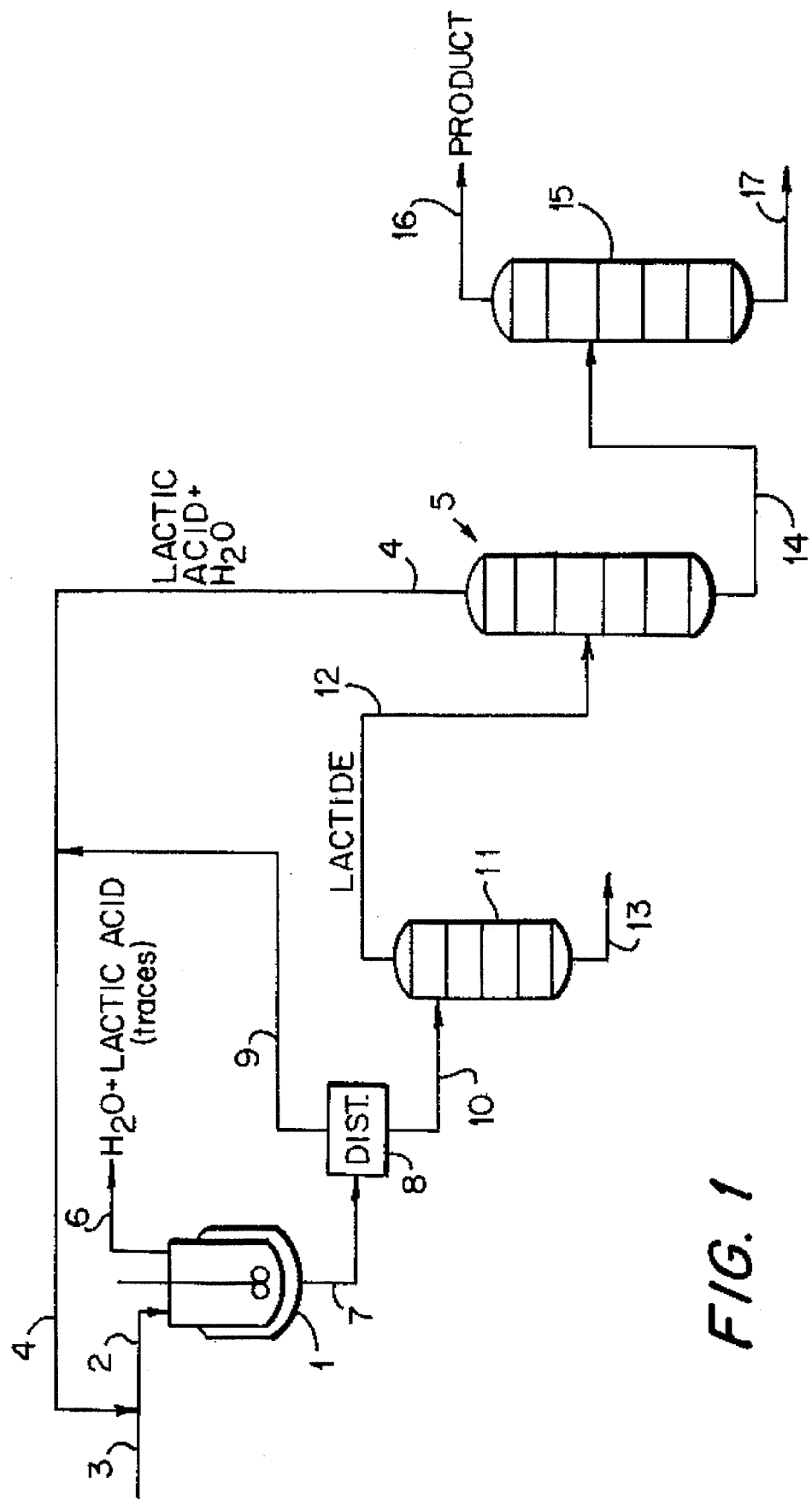

United States Patent [19]

Perego et al.

[11] Patent Number: 5,543,494

[45] Date of Patent: Aug. 6, 1996

[54] PROCESS FOR THE PRODUCTION OF POLY(LACTIC ACID)

[75] Inventors: Gabriele Perego, Ivrea; Catia Bastioli, Novara, both of Italy; Karolina Grzebieniak, Ksawerow; Antoni Niekraszewicz, Lodz, both of Poland

[73] Assignee: Ministero Dell'Univerita' E Della Ricerca Scientifica E Tecnologica, Italy

[21] Appl. No.: 374,733

[22] PCT Filed: Jul. 29, 1993

[86] PCT No.: PCT/EP93/02033

§ 371 Date: Jan. 27, 1995

§ 102(e) Date: Jan. 27, 1995

[87] PCT Pub. No.: WO94/03522

PCT Pub. Date: Feb. 17, 1994

[30] Foreign Application Priority Data

Aug. 4, 1992 [IT] Italy .................. TO92A0067

[51] Int. Cl.[6] .................. C08G 63/08; C08F 6/00
[52] U.S. Cl. .................. 528/354; 528/357; 528/361; 528/480; 528/501
[58] Field of Search .................. 528/354, 357, 528/361, 488, 501

[56] References Cited

U.S. PATENT DOCUMENTS

| 4,797,468 | 1/1989 | De Vries | 528/354 |
| 5,041,529 | 8/1991 | Shinoda et al. | 528/354 |
| 5,206,341 | 4/1993 | Ibay et al. | 528/361 |
| 5,225,129 | 7/1993 | van den Berg | 264/85 |
| 5,247,059 | 9/1993 | Gruber et al. | 528/354 |
| 5,302,694 | 4/1994 | Buchholz | 528/354 |
| 5,310,865 | 5/1994 | Enomoto et al. | 528/361 |

FOREIGN PATENT DOCUMENTS

| 0117086A2 | 8/1984 | European Pat. Off. . |
| 0264926A2 | 4/1988 | European Pat. Off. . |
| 0275581A1 | 7/1988 | European Pat. Off. . |
| 0261572A1 | 8/1988 | European Pat. Off. . |
| 1007347 | 9/1964 | United Kingdom . |
| 1142538 | 11/1967 | United Kingdom . |

OTHER PUBLICATIONS

Chemical Abstracts, vol. 68, No. 24, Jun. 10, 1968, Abstract No. 68:105648 (Kiyoshi Chujo et al. "Catalyst for Lactide Polymerization").

*Primary Examiner*—Shelley A. Dodson
*Attorney, Agent, or Firm*—Bryan Cave LLP

[57] ABSTRACT

Poly(lactic acid) with a high molecular weight is produced by the polycondensation reaction of the free monomer carried out in the presence of a catalytically effective quantity of iron ions. High molecular weight poly(lactic acid) and lactide are obtained as the principal products.

9 Claims, 1 Drawing Sheet

PROCESS FOR THE PRODUCTION OF POLY(LACTIC ACID)

This application is a 371 of PCT/EP93/02033 filed Jul. 29, 1993.

The present invention relates to a process for the production of poly(lactic acid) with a high molecular weight from the lactic acid monomer.

It is generally known that polyesters of the poly(lactic acid) type do not achieve good properties until their molecular weights are at least 25,000. The term poly(lactic acid) "with a high molecular weight" as used in the present description thus means a poly(lactic acid) which has a molecular weight of at least 25,000.

It is known that free lactic acid can be subjected to direct polycondensation, but the polycondensation reaction is an equilibrium reaction which is difficult to shift towards the formation of the desired product properties. It is particularly difficult to shift the reaction because the water produced in the course of the reaction distills from the highly viscous melt very slowly. These difficulties persist even if antimony oxide is used as a polycondensation catalyst, as proposed in the literature.

For these reasons, in order to prepare polymers with high molecular weights, lactic acid is converted into lactide, the polymerization of which by ring opening is described extensively in the literature. The lactide is produced from lactic acid via the initial formation of oligomeric lactic acid by the dehydration of aqueous lactic acid, followed by a catalytic transesterification reaction known as a "back-biting" reaction.

The catalysts proposed for the above reaction include tin powder, tin halides, tin carboxylates (EP-A-0 261 572 and EP-A-0 275 581), tin alkoxides (GB 1,007,347) and zinc or tin (EP-A-0 264 926 and U.S. Pat. No. 4,797,468).

The polymerization of the intermediate lactide by the opening of its ring is carried out with the use of initiators such as Sn (II) salts which are sensitive both to hydrolysis reactions and to degradative oxidation reactions. Since the presence of only traces of water, lactic acid or other impurities in the intermediate lactide are sufficient to de-activate the initiator or the growing chain, a precise purification of the crude lactide is necessary and, as described in the literature, is carried out by repeated crystallizations, normally at least three, and by means of a final drying step at 45° under vacuum for several hours.

The need of a purification of the lactide, which is done in batches, involves a substantial increase in the cost of producing the desired poly(lactic acid) with a high molecular weight.

It has now been found that, if the polycondensation of free lactic acid is carried out in the presence of iron salts, it is possible to produce poly(lactic acid) with a high molecular weight together with the cyclic dimer or lactide.

An object of the invention is therefore a process for the production of poly(lactic acid) with a high molecular weight by the polycondensation of the free monomer, characterized in that the polycondensation is carried out in the presence of a catalytically active quantity of iron ions to produce high molecular weight poly(lactic acid) and the cyclic dimer or lactide as the principal products.

In the process of the invention, the production yield of the poly(lactic acid) with a high molecular weight is not high and is generally of the order of from 15 to 20% with reference to the lactic acid monomer loaded into the reactor. However, the simultaneous production of lactide, in yields of the order of 55–65% with reference to the monomer, within the process for converting lactic acid into poly(lactic acid) as a whole, makes the process interesting from an economic point of view.

The method according to the invention is preferably carried out in successive steps, that is:

a first step in which the lactic acid, which is supplied in aqueous solution at a concentration preferably of from 75 to 95% by weight, is dehydrated and pre-condensed at a temperature of the order of 120°–220° C. (preferably between 160° and 200° C.) and preferably at atmospheric pressure, and in which the water present initially and that produced by the reaction is distilled off, and the cyclic dimer and oligomers of lactic acid with low molecular weights, generally of between 600 and 1000, are formed;

at least one further step in which polycondensation is carried out at a temperature of the order of 160°–220° C. and a subatmospheric pressure of the order of 0.2–20 mm Hg, producing the crude lactide, which is removed from the reaction medium by distillation, and poly(lactic acid) with a high molecular weight.

The reaction conditions of the polycondensation step are maintained until the desired molecular weight of more than 25,000 is achieved. The polycondensation step may be carried out in several stages with a progressive decrease in pressure.

The iron salts which act as catalysts may be added to the reaction mass in the initial dehydration step or in the final polycondensation step.

Catalytically effective quantities of iron ions are generally between 0.005 and 0.5% by weight of the lactic acid initially supplied.

The sources of iron ions, preferably Fe (II) ions, used are conveniently organic or inorganic salts which are soluble in the reaction medium such as, for example, Fe (II) acetate, propanoate, butanoate, pentanoate, hexanoate, cyclohexancarboxylate, phenylacetate, benzoate, paramethoxybenzoate, orthotoluate, and paratoulate. Conveniently, the iron ion may be introduced as iron lactate.

Lactic acid has an asymmetric carbon atom and thus exists in two enantiomeric forms. The lactide, however, has two asymmetric carbon atoms and thus exists in three stereoisomeric forms: the L-lactide, in which both the asymmetric carbon atoms have an L (or S) configuration; the D-lactide, in which both the asymmetric carbon atoms have a D (or R) configuration; the mesolactide, in which one asymmetric carbon atom has the L configuration and the other has the D configuration.

In the method of the invention, it is preferable to use L-lactic acid which leads to the production of L-lactide, or a racemic mixture of D- and L-lactic acid which leads to the production of crude D,L-lactide containing a mixture of racemic-D,L-lactide and meso-D,L-lactide.

According to another aspect of the invention, the crude L-lactide or D,L-lactide produced can be advantageously purified by methods such as fractional distillation or recrystallization and azeotropic distillation. The purified lactide can be polymerized in the presence of a tin catalyst, such as tin octanoate, to give polylactic acid with a high molecular weight.

Although the method of the invention is described in the following examples with reference to a discontinuous process, it is intended that the method can be also carried out continuously.

FIG. 1 shows a diagram of a continuous process in which the crude lactide produced is purified continuously by fractional distillation according to a particularly advantageous embodiment of the method.

With reference to the drawing, a flow 2 constituted by an aqueous solution of L-lactic acid resulting from the sum of a supply flow of aqueous lactic acid solution 3 and a recycled flow 4 including lactic acid and water coming from a fractional distillation column 5 is supplied to a CSTR reactor.

A flow 6 including water and traces of lactic acid is distilled continuously from the reactor 1. A flow 7 withdrawn from the reactor 1 includes a mixture of oligomers and lactide which, conveniently, is sent to an auxiliary distillation stage 8 from which a flow 9 constituted by a concentrated aqueous solution of lactic acid is distilled and, conveniently, is recycled to the reactor 1. A flow 10 leaving the distillation column 8 is supplied to a polycondensation reactor 11 where, in the method according to the invention, the catalyst described above is added thereto. As has been seen, the catalyst may, however, be added directly to the reactor 1.

A flow 12, constituted essentially by the crude lactide, and a flow 13 of poly(lactic acid) with a high molecular weight are withdrawn from the polycondensation reaction 11.

Conveniently, the crude lactide is sent to a fractional distillation column, indicated 5, of which the overhead product 4 including the lactic acid impurities which were in the crude lactide, is recycled to the reactor 1. The end product 14 may be supplied to a further fractional distillation column 15 from which the desired product 16 and a residue 17 are withdrawn.

The purified lactide thus produced may be polymerized directly in an extruder according to the method described in patent application DE 3 936 188, preferably at a temperature of from 180° to 195° C., in the presence of a tin octanoate catalyst.

The method of the invention will now be described in greater detail with reference to the following examples.

CHARACTERIZATIONS

The melting points and the glass-transition temperatures of the polymers were obtained by differential calorimetry (Perkin Elmer DSC 7 calibrated with In) with temperature increments of 10° C./min. The melting points given are taken at the tips of the peaks. The quantities of residual monomer in the samples were estimated by thermogravimetric analysis (Perking Elmer TGA7). The samples were brought to a temperature of 150° C. at a nominal rate of 40° C./minute and kept at that temperature for 60 minutes. It was thus possible to derive the quantity of residual monomers from the percentage decrease in weight.

The solutions, diluted with lactic acid, were analyzed by direct titration with 0.1N NaOH and phenolphthalein as the indicator. For concentrated solutions (for example 40–70%) also containing lactide a back titration was carried out. An excess of NaOH was added to the sample to be titrated an hydrolysis was allowed to proceed with stirring at ambient temperature for two hours and the sample was then back titrated with 0.1N HCl and phenolphthalein.

The quantities of water in the crude lactide samples were determined by Karl-Fischer titration.

The free lactic acid content in the crude lactide samples was quantified by titration with $LiOCH_3$ in an anhydrous environment.

EXAMPLE 1

An aqueous solution containing 88% by weight of L-lactic acid, corresponding to 18.2 kg of L-lactic acid, was supplied to a 25 $dm^3$ stainless steel reactor with a stirrer, heating elements, a condenser and thermocouples for checking the temperature. The contents of the reactor were brought to 195° C. and the aqueous fraction was distilled off at ambient pressure for two hours to produce 4.53 kg of distillate which was found by titration to contain 16% of L-lactic acid.

The pressure was then reduced overall to 15 mm Hg (2000 $N/m^2$) and the temperature was kept at 195° C. A second fraction of 1.32 kg was thus separated in one hour and was found by titration to contain 66% by weight of L-lactid acid. A quantity of iron lactate corresponding to 4 g of iron was then added to the reactor and the reactor was kept at a temperature of 200° C. for 20 hours, the L-lactide being distilled off to produce a third distillation fraction constituted by 7.7 kg of fused L-lactide which crystallized gradually in the collecting flask; the yield of L-lactide was 60.2%.

When the L-lactide had been distilled off, the reactor contained 2.24 kg of poly(lactic acid) having an intrinsic viscosity of 0.9 dl/g (Ubbelohde capillary viscosimeter, C=0.20 g/dl, T=25° C., solvent chloroform) corresponding to a molecular weight of the polymer of about 30,000. The polymer thus obtained had a $T_g$ of 51° C. and a decomposition temperature of 261° C.; the yield of poly(lactic acid) was 17.5% with reference to the starting lactic acid.

The L-lactide produced had a water content of 0.3% and a free lactic acid content of about 5.2%.

EXAMPLE 2

Purification of L-lactide by Recrystallization with Azeotropic Distillation 716 g of the crude L-lactide produced in the Example 1 was placed in a 1.5 l flask and 450 ml of anhydrous toluene was added thereto. The mixture was brought to boiling point, 200 ml of toluene was slowly distilled off, a further 250 ml of toluene was added and another 150 ml of solvent was distilled slowly. Actived carbon was then added to the boiling solution which was then filtered under nitrogen through celite and left to recrystallize.

The L-lactide thus recrystallized was filtered under nitrogen, washed with two portions of anhydrous and cold toluene, drained, and dried at 13.3 $N/m^2$ (0.1 mm Hg) and 45° C.

429 g of L-lactide, which was equal to a yield of 60%, was obtained, with a melting point of 75°–85° C.

By polymerization with tin octanoate (0.056% by weight) this L-lactide produced a polymer with an intrinsic viscosity of 2.96 (molecular weight 130,000).

EXAMPLE 3

Purification of L-lactide by Fractional Distillation 700 g of crude L-lactide produced according to Example 1 was placed in a 1 l boiling flask with an electromagnetic stirrer and a thermometer. A distillation column with a useful lenght of 600 mm and an internal diameter of 25 mm, filled with glass rings and with an outer jacket under vacuum was placed thereon. A liquid-cooled condenser with manual reflux regulation was mounted on the column. The portion in which the temperature was not controlled by the circulating liquid (the reflux regulator) was surrounded by an electric heating belt.

The distillation was carried out under vacuum with pressure values of between 67 and 107 N/m² (0.5–0.8 mm Hg). The temperature in the boiling flask was changed progressively from an initial temperature of 144° C. to a final temperature of 170° C., in order to maintain even distillation. The vapour temperature showed an increase from an initial temperature of 75° C. to a final temperature of 188°0 C. The fraction containing only lactide corresponded to vapour temperatures of between 105° C. and 115° C. The difference between the temperature was between 30° C. and 40° C.

The temperature of the liquid circulating in the condenser (ethylene glycol) was brought from an initial temperature of 30° C. to a final temperature of 90° C. The electric heating belt was switched on only for the lactide fraction and was brought to 100° C.

The following fractions were obtained:

| FRACTION | QUANTITY | MELTING POINT | MESO D,L % |
| --- | --- | --- | --- |
| I (top) | 57.5 g | — | — |
| II | 128.5 g | 25–35° C. | 60 |
| III | 287.6 g | 59–65° C. | 22 |
| IV | 170.0 g | 70–85° C. | 5.3 |
| V | 22.1 g | 82–88° C. | 1.3 |
| residue in the flask | 33.0 g | — | — |
| total | 698.7 g | | |

The fractions III and IV are equivalent to a total of 458 g which represents a yield of 65% with reference to the starting lactic acid.

By polymerization with tin octanoate (0.056%), the fractions III and IV produced polymers with intrinsic viscosities of 0.83 and 0.51, respectively.

EXAMPLE 4

Purification of L-lactide by Treatment with $CaH_2$

The L-lactide used had already been partially purified by distillation and polymerization to poly(lactic acid) with a viscosity of 1.09.

402 g of this L-lactide were further rectified by the addition of 10 g of $CaH_2$ to the boiling flask.

The following fractions were obtained:

| FRACTION | QUANTITY | MELTING POINT | MESO D,L % |
| --- | --- | --- | --- |
| I (top) | 71 g | — | — |
| II | 285 g | 86–92° C. | 1.6 |
| III | 35 g | — | — |

By polymerization with tin octanoate (0.056%), the fraction II produced a polymer with intrinsic viscosity of 3.21 (molecular weight 146,000).

EXAMPLE 5

Purification of L-lactide by Successive Fractional Distillations 722 g of crude L-lactide prepared as described in Example 1 were placed in a three-necked 1 liter flask with a mechanical stirrer. A distillation column 1 m long with an internal diameter of 3 cm and an outer jacket which was under vacuum and silvered internally, was disposed above the flask.

A condenser was placed above the column vacuum with pressure values of between 67 and 107 N/m² (0.5–0.8 mm Hf).

The temperature in the boiling flask was changed progressively from in initial temperature of 140° C. to a final temperature of 150° C. in order to maintain even distillation.

The 1-lactide was fractionated as follows:

| FRACTION | QUANTITY |
| --- | --- |
| I | 72 g |
| II | 574 g |
| residue in the column | 57 g |
| residue in the flask | 15 g |

Towards the end of the distillation it was necessary to add 5 g of powdered Sn to depolymerize oligomers which had reformed in the boiling flask.

40 g were removed from the fraction II and by polymerization with tin octanoate (0.056% by weight), produced a polymer with an intrinsic viscosity of 0.37 (molecular weight 7,600).

532 g of lactide from the fraction II were redistilled as follows:

| FRACTION | QUANTITY |
| --- | --- |
| III | 40.4 g |
| IV | 444.7 g |
| column and flask residues | 37.7 g |

There was no need to add tin to the boiling flask since, in this case, little or no re-oligomerization of the lactide took place. Once the top fraction had been separated, the distillation column with a 25 cm column with a diameter of 2.5 cm, heated externally to 100° C.

40 g were removed from the fraction IV and, by polymerization with tin octanoate (0,56%), produced a polymer with an intrinsic viscosity of 1.96 (molecular weight 73,000).

401 g of lactide from the fraction VI were redistilled as follows:

| FRACTION | QUANTITY | MESO D, L% |
| --- | --- | --- |
| V | 55.6 g | — |
| VI | 328.5 g | 2,9 |
| column and flask residues | 17 g | — |

There was no need to add tin to the boiling flask since, in this case, little or no re-oligomerization of the lactide took place. Once the top fraction had been separated, the 1 m distillation column was replaced by a 25 cm column with a diameter of 2.5 cm, heated externally to 100° C.

40 g were removed from the fraction VI and, by polymerization with tin octanoate (0.056%), produced a polymer with an intrinsic viscosity of 3.24 (molecular weight 148,000).

The total quantity of the correct product (two samplings of 40 g in the course of the synthesis) was 392 g, which is equal to a yield of 57%.

EXAMPLE 6

Synthesis of poly(L-lactide)

The preparation of the polymers from purified L-lactide was carried out in all cases by placing 40 g of L-lactide in a two-necked 100 ml flask under nitrogen. A solution containing 0.0225 g of tin octanoate in anhydrous toluene (from a mother solution of 0.6 g of tin octanoate in 6 ml of anhydrous toluene, corresponding to 0.056% by weight) was added.

A vacuum was then applied for several minutes to remove the toluene completely, and the flask was immersed in an oil bath heated to 130° C. These conditions were maintained for 24 hours.

The results of the polymerisation of Examples 1 to 6 are indicated in Table 1.

TABLE 1

Chemical and physical characteristics of the polymer

| Monomer used | Viscosity(1) (dl/g) | Tg (°C.) | Melting Pt. (°C.) | Delta H (j/g) | [alpha] (2)° |
|---|---|---|---|---|---|
| Ex. 1 | 0.9 | 51 | | | |
| Ex. 2 | 2.96 | 53 | 179 | 65 | −152 |
| Ex. 3/III | 0.83 | 49 | — | — | −116 |
| Ex. 3/IV | 0.51 | 49 | 105 | 2.4 | −136 |
| Ex. 4/II | 3.21 | 53 | 167 | 29 | −149 |
| Ex. 5/II | 0.37 | 52 | 147 | 4 | −145 |
| Ex. 6/IV | 1.96 | 51 | 151 | 9 | −149 |
| Ex. 6/VI | 3.24 | 56 | 171 | 51 | −151 |

(1) intrinsic viscosity measured in chloroform at 25° C. (c = 0.200 g/dl) by means of an Ubbelohde capillary viscosimeter.
(2) specific optical activity measured in methylene chloride at 20° C. (c = 0.400 g/dl)
([alpha] = −158 for PLLA (9)).

We claim:

1. A process for the production of poly(lactic acid) with a viscosity average molecular weight of at least 25,000 by the polycondensation of the lactic acid free monomer, said process comprising carrying out the polycondensation in the presence of from 0.005 to 0.5% by weight, with respect to free monomer supplied, of an iron catalyst to produce said poly(lactic acid) with viscosity average molecular weight higher than 25,000 and distilling off and collecting lactide formed during said polycondensation.

2. A process according to claim 1, wherein the catalyst is an organic or inorganic iron (II) salt.

3. A process according to claim 2, wherein the catalyst is selected from the group consisting of acetate, propanoate, butanoate, pentanoate, hexanoate, cyclohexancarboxylate, phenylacetate, benzoate, paramethoxybenzoate, orthotoluate and paratoluate of Fe (II).

4. A process according to claim 2, wherein the catalyst is iron (II) lactate.

5. A process according to claim 1, comprising:
   a first dehydration and pre-condensation step carried out at a temperature of between 160° and 200° C. and atmospheric pressure, in which a lactic acid solution is converted into lactide and oligomers of lactic acid and water is distilled off from the reaction mass, and
   at least one further polycondensation step carried out at subatmospheric pressure and at a temperature of between 160° and 220° C., in which the product of the polycondensation step is converted into lactide and poly(lactic acid) with a viscosity average molecular weight of at least 25,000.

6. A process according to claim 5, wherein the catalyst is added to the reaction mass during the polycondensation step.

7. A process according to claim 1 wherein the lactide produced is purified by fractional distillation.

8. A process according to any one of claims 1 to 6, in which the lactide produced is purified by recrystallization and azeotropic distillation.

9. A process according to claim 6, wherein the purified lactide is polymerized in the presence of a tin catalyst to give poly(lactic acid) with a molecular weight of at least 25,000.

* * * * *